(12) United States Patent
Evans et al.

(10) Patent No.: US 11,043,679 B2
(45) Date of Patent: Jun. 22, 2021

(54) ALTERNATIVE LOW COST ELECTRODES FOR HYBRID FLOW BATTERIES

(71) Applicant: ESS TECH, INC., Portland, OR (US)

(72) Inventors: Craig E. Evans, West Linn, OR (US);
Yang Song, West Linn, OR (US);
Jeffrey Chen, Portland, OR (US)

(73) Assignee: ESS TECH, INC., Portland, OR (US)

( * ) Notice: Subject to any disclaimer, the term of this patent is extended or adjusted under 35 U.S.C. 154(b) by 1127 days.

(21) Appl. No.: 14/984,416

(22) Filed: Dec. 30, 2015

(65) Prior Publication Data

US 2016/0190604 A1 Jun. 30, 2016

Related U.S. Application Data

(60) Provisional application No. 62/098,200, filed on Dec. 30, 2014.

(51) Int. Cl.
*H01M 4/88* (2006.01)
*H01M 8/0239* (2016.01)
(Continued)

(52) U.S. Cl.
CPC ....... *H01M 4/8803* (2013.01); *H01M 4/8817* (2013.01); *H01M 4/8828* (2013.01);
(Continued)

(58) Field of Classification Search
CPC ............. H01M 4/8803; H01M 4/8828; H01M 4/8817; H01M 8/20; H01M 8/188;
(Continued)

(56) References Cited

U.S. PATENT DOCUMENTS 6,475,661 B1 11/2002 Pellegri et al.
2004/0202939 A1* 10/2004 Clarke .................. H01M 6/182
429/300
(Continued)

FOREIGN PATENT DOCUMENTS

JP 2006278294 A 10/2006
WO WO-2011137239 * 11/2011 ............. H01G 11/42
(Continued)

OTHER PUBLICATIONS

WO-2011137239.*
(Continued)

*Primary Examiner* — Milton I Cano
*Assistant Examiner* — Kiran Akhtar
(74) *Attorney, Agent, or Firm* — McCoy Russell LLP (57) ABSTRACT

An electrode for use in an all-iron redox flow battery is provided. In one example, the electrode may include a plastic mesh; and a coating on the plastic mesh. The coating may be a hydrophilic coating or a conductive coating and the electrode may have an electrode reaction potential is less than 0.8V. Further, a method of manufacturing a coated plastic mesh electrode for use in an all-iron redox flow battery is provided. In one example method, the steps include fabricating a plastic mesh, treating the plastic mesh by applying a solvent treatment or a plasma treatment or a mechanical abrasion treatment; coating the plastic mesh with a material selected from: carbon inks, metal oxides, and hydrophilic polymers.

17 Claims, 10 Drawing Sheets
(4 of 10 Drawing Sheet(s) Filed in Color)

(51) Int. Cl.
*H01M 8/0245* (2016.01)
*H01M 8/18* (2006.01)
*H01M 8/20* (2006.01)

(52) U.S. Cl.
CPC ....... *H01M 8/0239* (2013.01); *H01M 8/0245* (2013.01); *H01M 8/188* (2013.01); *H01M 8/20* (2013.01); *H01M 8/18* (2013.01); *H01M 8/182* (2013.01); *H01M 8/184* (2013.01); *H01M 8/186* (2013.01); *Y02E 60/50* (2013.01)

(58) Field of Classification Search
CPC .... H01M 8/0239; H01M 8/0245; H01M 8/18; H01M 8/182; H01M 8/184; H01M 8/186; Y02E 60/528
See application file for complete search history.

(56) References Cited

U.S. PATENT DOCUMENTS

| | | | |
|---|---|---|---|
| 2007/0054175 A1 | 3/2007 | Maendle et al. | |
| 2011/0003213 A1* | 1/2011 | Burchardt | H01M 8/0239 429/402 |
| 2011/0111296 A1* | 5/2011 | Berdichevsky | H01M 4/0428 429/218.1 |
| 2011/0256435 A1* | 10/2011 | Kim | H01M 4/8657 429/94 |
| 2013/0089769 A1* | 4/2013 | Proctor | H01G 11/42 429/127 |
| 2013/0157167 A1* | 6/2013 | Peters | H01M 4/8657 429/482 |
| 2013/0266853 A1* | 10/2013 | Sano | H01M 4/06 429/199 |
| 2014/0060666 A1 | 3/2014 | Evans et al. | |
| 2014/0065460 A1* | 3/2014 | Evans | H01M 8/20 429/101 |
| 2014/0255788 A1* | 9/2014 | Seki | C22F 1/04 429/245 |
| 2015/0263358 A1 | 9/2015 | Zaffou et al. | |
| 2016/0010227 A1* | 1/2016 | Pant | H01M 4/8605 429/241 |
| 2016/0190604 A1 | 6/2016 | Evans et al. | |

FOREIGN PATENT DOCUMENTS

| | | | | |
|---|---|---|---|---|
| WO | WO-2011137239 A1 * | 11/2011 | | H01G 11/42 |
| WO | WO2012167057 | * | 12/2012 | H01M 10/36 |
| WO | WO-2013018157 | * | 2/2013 | H01M 2/66 |
| WO | WO-2014131799 | * | 9/2014 | H01M 8/1004 |
| WO | WO-2014131799 A1 * | 9/2014 | | C25B 11/035 |

OTHER PUBLICATIONS

WO-2014131799.*
WO2012167057.*
WO-2013018157.*
WO-2014131799-A1.*
WO-2011137239-A1.*
ISA Korean Intellectual Property Office, International Search Report and Written Opinion Issued in Application No. PCT/US2018/032820, dated Sep. 20, 2018, WIPO, 13 pages.
Zeng, Y. et al., "Performance enhancement of iron-chromium redox flow batteries by employing interdigitated flow fields," Journal of Power Sources, vol. 327, Sep. 30, 2016, 7 pages.
Zeng, Y. et al., "A hyrdrogen-ferric ion rebalance cell operating at low hydrogen concentrations for capacity restoration of iron-chromium redox flow batteries," Journal of Power Sources, vol. 352, Jun. 1, 2017, 6 pages.
European Patent Office, Extended European Search Report Issued in Application No. 18805497.7, dated Dec. 16, 2020, Germany, 8 pages.

* cited by examiner

ALTERNATIVE LOW COST ELECTRODES FOR HYBRID FLOW BATTERIES

CROSS-REFERENCE TO RELATED APPLICATIONS

The present application claims priority to U.S. Patent Application No. 62/098,200, entitled "CARBON COATED PLASTIC ELECTRODES FOR HYBRID BATTERIES", filed on Dec. 30, 2014, the entire contents of which are hereby incorporated by reference for all purposes.

ACKNOWLEDGMENT OF GOVERNMENT SUPPORT

This invention was made with government support under contract no. DE-AR0000261 awarded by the DOE, Office of ARPA-E. The government has certain rights in the invention.

FIELD

The current disclosure is directed towards electrode materials for use in hybrid flow battery systems.

BACKGROUND/SUMMARY

A reduction-oxidation (redox) flow battery is an electrochemical storage device which stores energy in a chemical form. The stored chemical energy is converted to an electrical form via spontaneous reverse redox reactions. To restore the dispensed chemical energy, an electrical current is applied to induce the reverse redox reaction. Hybrid flow batteries deposit one or more of the electro-active materials as a solid layer on an electrode. Hybrid flow batteries include a chemical that forms a solid precipitate plate on a substrate at a point throughout the charge reaction which may also be dissolved throughout the discharge reaction. During the charge reaction, the chemical may solidify on the surface of the substrate forming a plate near the electrode surface. The chemical is regularly a metallic compound. In hybrid flow battery systems, the energy stored by the redox battery may be limited by the amount of metal plated during charge and may accordingly be determined by the efficiency of the plating system as well as the available volume and surface area to plate.

The positive and negative electrodes in redox flow batteries take part in the electrochemical reactions for storing and releasing chemical energy. Thus, the electrodes may be considered one of the most critical components in batteries, as the electrode affects battery performance, capacity, efficiency and the overall cost.

One example of a hybrid redox flow battery is an all-iron redox flow battery (IFB). The IFB uses iron as an electrolyte for reactions including a negative electrode where plating occurs, herein also referred to as the plating electrode, and a positive electrode where a redox reaction occurs, herein also referred to as the redox electrode. The performance of an IFB battery can be broken down to its plating electrode performance (negative electrode), redox electrode performance (positive electrode), and ohmic resistance loss. On the plating electrode, the ferrous ($Fe^{2+}$) ion gains electrons and plates as solid iron on the substrates during charge, as shown in equation (1) below, and the solid iron dissolves as ferrous ions and releases two electrons during discharge. The equilibrium potential for the iron plating reaction is $-0.44V$. On the redox electrode, the redox reaction between ferrous and ferric ($Fe^{3+}$) ions occurs during charge and discharge. On the positive electrode, two $Fe^{2+}$ ions lose two electrons to form $Fe^{3+}$ ions during charge, as shown in equation (2) below and two $Fe^{3+}$ ions gain two electrons to form $Fe^{2+}$ during discharge. The equilibrium potential between ferrous and ferric ions is $+0.77V$. Thus, the reaction in an IFB redox flow battery is reversible.

$$Fe^{2+} + 2e^- \leftrightarrow Fe^0 \text{ (Negative Electrode)} \quad (1)$$

$$2Fe^{2+} \leftrightarrow 2Fe^{3+} + 2e^- \text{ (Positive Electrode)} \quad (2)$$

On the negative electrode of an IFB, the ferrous iron reduction reaction competes with two side reactions: the reduction of hydrogen protons $H^+$ (reaction (3)), wherein two hydrogen protons each accept a single electron to form hydrogen gas, $H_2$, and the corrosion of deposited iron metal to produce ferrous ion $Fe^{2+}$ (reaction (4)), respectively:

$$H^+ + e^- \leftrightarrow \frac{1}{2}H_2 \quad \text{(Hydrogen proton reduction)} \quad (3)$$

$$Fe^0 + 2H^+ \leftrightarrow Fe^{2+} + H_2 \quad \text{(Iron corrosion)} \quad (4)$$

These two side reactions may reduce the overall battery efficiency, because electrons transferred to the negative electrode may be consumed by hydrogen production rather than by iron plating. Furthermore, these side reactions may result in imbalanced electrolytes, which may in turn, result in battery capacity loss over time.

The $Fe^{2+}/Fe^{3+}$ redox reaction at the positive electrode is fast kinetically. The IFB battery performance may therefore be limited by its negative electrode performance, which is a result of the plating kinetics, plating resistance, and plating mass transport losses. Further, the IFB battery capacity is driven by how much solid iron the negative electrode can store. In addition, the IFB battery efficiency is related to the extent of side reactions such as side reactions (3) and (4) on the plating electrode. Therefore, it may be desirable to select a plating electrode whose properties are optimized for battery performance and efficiency at a minimal cost.

Currently, titanium (Ti) based mesh materials are used as the negative (plating) electrode and carbon (C) based porous materials, such as carbon paper and carbon felt, are used as the positive electrode. The Ti material is stable in the negative half-cell environment and the mesh increases the overall surface area and volume for plating. The current electrode materials are stable during charging cycles wherein a high potential may be applied to the electrode. However, these plating and redox electrode materials are expensive and increase the overall battery cost. Ti material also exhibits catalytic effects for hydrogen evolution reactions; therefore the use of Ti material may result in a larger extent of side reaction, e.g. the hydrogen proton reduction (3).

The inventors herein have recognized the above issues and have developed a cost effective electrode based on plastic meshes for use as the plating electrode in an all-iron redox flow battery. Some of the coating materials may be non-conductive but these materials may change the surface properties of the plastic mesh from hydrophobic to hydrophilic such that hydrogen bubbles generated from reactions (3) and (4) may be purged out of the battery effectively. Some of the coatings may be conductive such that they may increase the plating electrode area while making the plastic mesh hydrophilic. The conductive versions of the coated plastic mesh may also be used as the redox electrode. The electrolyte provided in the IFB redox battery is rather benign with pH ranging between 1 and 4, not being too acidic (pH<0) or alkaline (pH>14), and electrode reaction potential is less than carbon corrosion potential of 0.8V during charging and discharging. Thus, a coated plastic mesh electrode is provided which maintains redox flow battery system performance while significantly reducing cost. The coated plastic mesh electrode provides a cost effective design which may be applied in redox flow batteries that involve material plating out of the electrolyte wherein the electrolyte pH is not too acidic or alkaline and electrode potential is less than carbon corrosion potential of 0.8V.

For example, the disclosed coated plastic mesh electrode may be used in an all-iron redox flow battery. The coated plastic mesh electrode may be used as the plating electrode, the redox electrode, or as both electrodes in a battery.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present disclosure relates to materials and methods for a novel coated plastic mesh electrode for use in a redox flow battery system which improves or maintains performance in comparison to current electrode materials while reducing overall cost. Redox flow battery systems, an example illustrated in FIG. 1, may include an all-iron hybrid redox flow battery (IFB), a Zn—$Br^{2+}$ flow battery, or a Zn—NiOOH ($MnO_2$) battery, and may comprise the disclosed electrode. The disclosed electrode may be used as the plating electrode, the redox electrode or both of the electrodes in a redox flow battery system in some embodiments. In one example, for an IFB system, the iron plating kinetics are seen to be initially slow on non-iron based substrates, as illustrated in FIG. 2. Thus, the disclosed coated plastic mesh electrode, illustrated in FIGS. 3A and 3B, improves or maintains performance after an initial plating cycle. A comparison of the plating electrode performance between a baseline TI mess and coated meshes are illustrated in FIG. 4. The use of a coated plastic mesh electrode reduces the amount of electrode active material, and therefore the cost of the expensive conductive materials. The negative electrode pressure of a plastic mesh with a hydrophilic coating and the pressure of a plastic mesh with no coating are compared in the graph provided in FIG. 5. Evidence of negative plating characteristics of non-coated plastic meshes is provided in FIG. 6. The disclosed electrode has an optimized thickness and opening of the plastic mesh and carbon coating, as illustrated in FIG. 7, which reduces electrode resistivity, thereby improving performance as compared to current redox flow electrodes, illustrated in FIGS. 9 and 10.

Figure 1:
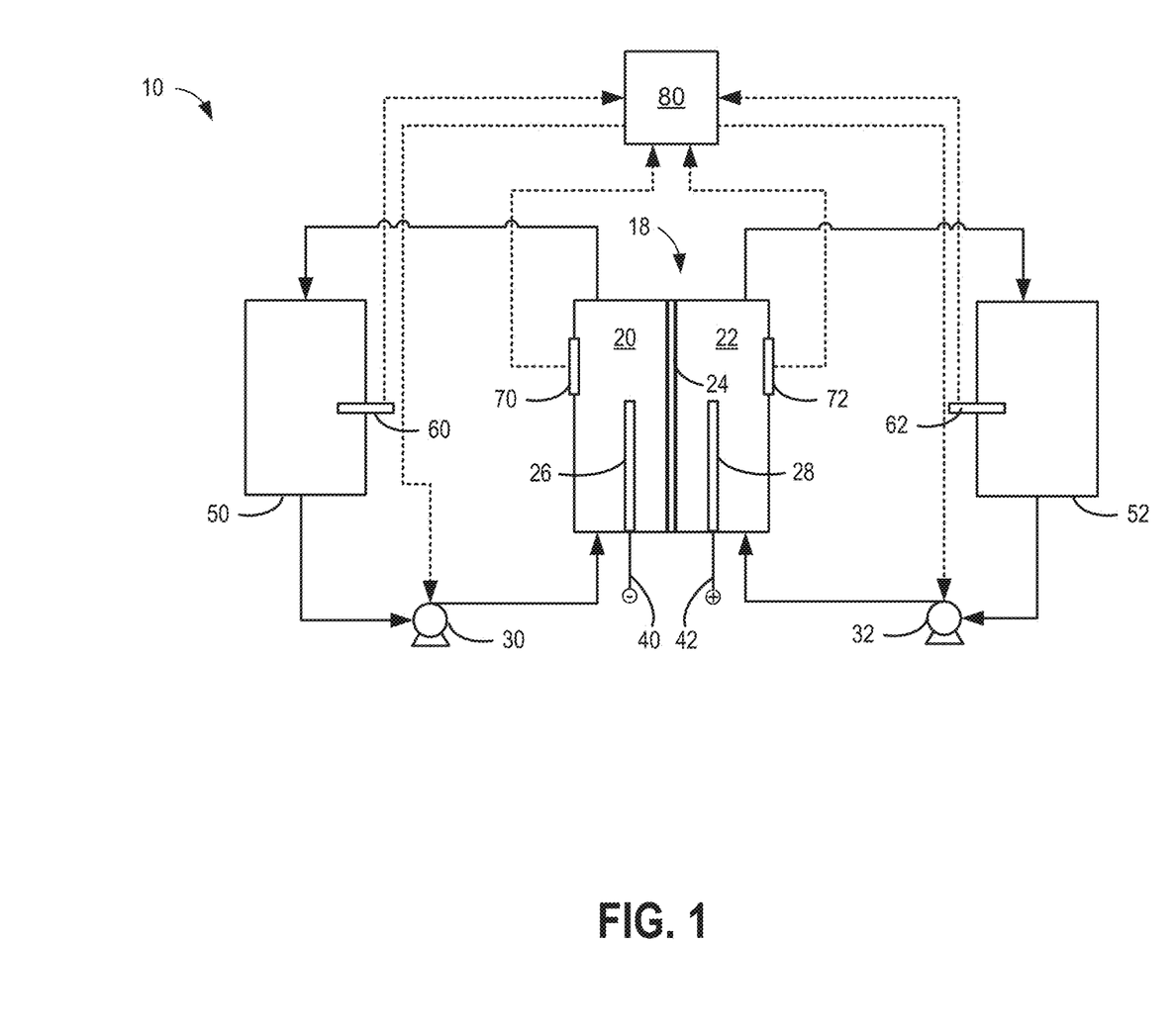
FIG. 1 shows a schematic of an example redox flow battery system.
Figure 2:
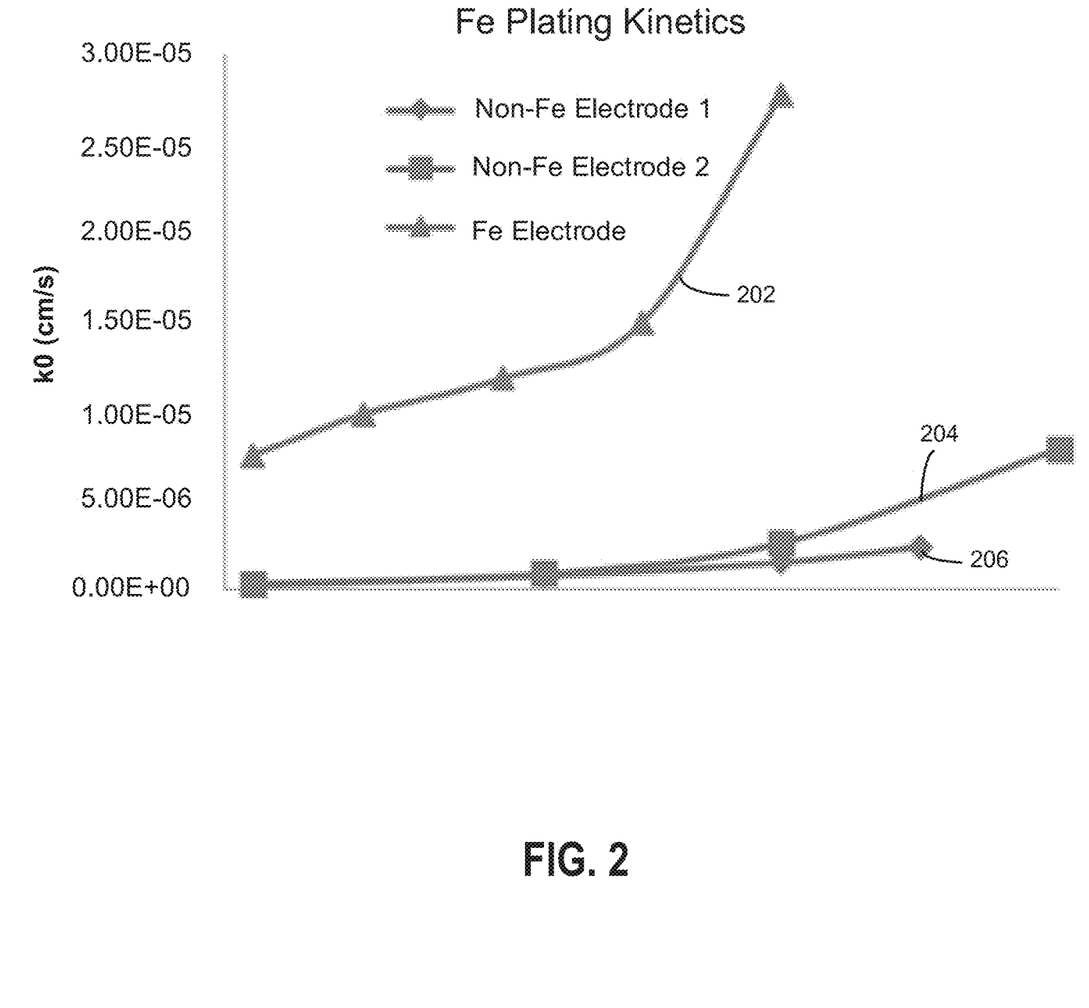
FIG. 2 illustrates Fe plating kinetics on various electrodes.

Turning to FIG. 1, an example schematic of a redox flow battery system 10 is provided wherein a single redox battery cell 18 is illustrated. The single redox battery cell generally includes a negative electrode compartment 20, a positive electrode compartment 22, and a separator 24. The separator 24 is positioned between the negative and positive electrode compartments. In some examples, multiple redox battery cells 18 may be combined in series and/or in parallel to create a higher voltage and/or current in the redox flow battery system.

The negative electrode compartment 20 may comprise a negative electrode 26 and a first electrolyte, also referred to as a negative electrode electrolyte, containing electro-active materials. Similarly, the positive electrode compartment 22 may comprise a positive electrode 28 and a second electrolyte, also referred to as a positive electrode electrolyte, containing electro-active materials.

The separator 24 may comprise an electrically insulating ionic conducting barrier. The separator functions to prevent bulk mixing of the first electrolyte in the negative electrode compartment 20 with the second electrolyte in the positive electrode compartment 22 while still allowing conductance of specific ions there through. In one example, separator 24 may comprise an ion-exchange membrane. In another example, separator 24 may comprise a micro-porous membrane.

The electrolytes may typically be stored in tanks external to the redox battery cell 18. The electrolyte may be pumped via pumps 30 and 32 through the negative electrode compartment 20 and the positive electrode compartment 22 respectively. In the example illustrated in FIG. 1, the first electrolyte is stored at a first electrolyte source 50, which may further comprise an external first electrolyte tank (not shown) and the second electrolyte is stored at a second electrolyte source 52, which may further comprise an external second electrolyte tank (not shown).

During battery charge, a current is applied to the negative battery terminal 40 and the positive battery terminal 42. During charge, the positive electrode electrolyte is oxidized, loses one or more electrons, at the positive electrode 28, and the negative electrode electrolyte is reduced, and gains one or more electrons, at the negative electrode 26.

During battery discharge, the reverse redox reactions to the charge reactions occur at the electrodes. Thus, during discharge, the positive electrode electrolyte is reduced at the positive electrode 28 and the negative electrode electrolyte is oxidized at the negative electrode 26. In one example, the positive electrode and the negative electrode may be the carbon coated plastic mesh electrode described below.

The electrochemical redox reaction in the negative electrode compartment 20 and the positive electrode compartment 22 maintain an electrical potential difference across the redox flow battery system and can induce a current through a conductor while the reactions are sustained. The amount of energy, the capacity, stored by a redox flow battery system may be limited by the amount of electro-active material in the electrolytes for discharge. The amount of electro-active material is based on the total volume of the electrolytes and the solubility of the electro-active materials. Furthermore, the amount of energy stored by the redox flow battery system may be limited by the amount of solid iron the negative electrode can store.

During operation of the redox flow battery system, sensors and probes may be used to monitor and control chemical properties of the electrolyte, such as electrolyte pH, concentration, state of charge, and the like. For example, the redox flow battery system may comprise sensors 60 and 62, which may be positioned to monitor the electrolyte conditions at the first electrolyte source 50 and the second electrolyte source 52 respectively. As another example, the redox flow battery system may comprise sensors 70 and 72, which may be positioned to monitor the conditions at the negative electrode compartment 20 and the positive electrode compartment 22 respectively.

The redox flow battery system may further comprise other sensors positioned at other locations throughout the redox flow battery system to monitor the electrolyte chemical properties and other properties. For example, the redox flow battery system may comprise one or more sensors disposed within an external acid tank, wherein acid may be supplied via an external pump to the redox flow battery system in order to reduce precipitate formation in the electrolytes. The one or more sensors may monitor the acid volume or the pH within the external acid tank. Additional external tanks and sensors may be included for supplying other additives to the redox flow battery system.

The redox flow battery system may be controlled at least partially by a control system including controller 80. The controller 80 may receive sensor information from the various sensors positioned within the redox flow battery system. For example, the controller 80 may actuate pumps 30 and 32 to control the electrolytes' flow through the redox battery cell 18. Thus, the controller 80 may be responsive to one or more of the sensors and/or probes positioned throughout the redox flow battery system.

Hybrid flow batteries are a redox flow battery which may be characterized by the deposit of one or more of the electro-active materials as a solid layer on an electrode. In hybrid flow battery systems, the charge capacity (the amount of energy stored) of the redox battery may be limited by the amount of metal plated during battery charge and may accordingly depend on the efficiency of the plating system as well as the available volume and surface area available for plating.

In the hybrid flow battery system, the negative electrode 26 may be referred to as the plating electrode and the positive electrode 28 may be referred to as the redox electrode. The negative electrode electrolyte within the negative electrode compartment 20 (herein also referred to as the plating side) of the battery may be referred to as the plating electrolyte and the positive electrode electrolyte within the positive electrode compartment 22 (herein also referred to as the redox side) of the battery may be referred to as the redox electrolyte.

As mentioned previously, one example of a hybrid flow battery is an IFB, which uses iron as an electrolyte for plating and redox reactions. The key components present in the IFB are similar to the hybrid flow battery described in FIG. 1, wherein the IFB comprises a benign electrolyte, including iron salts. The benign electrolyte is not too acidic (pH<0) or too alkaline (pH>14) and may have a pH near neutral, for example: IFB negative electrolyte operates between pH of 3-4. As used herein, the phrase pH around neutral provides for a pH range wherein the plastic mesh material used for the disclosed electrode does not degrade in the electrolyte at the potentials applied during charging and discharging of the redox flow battery. The IFB includes a plating electrode, where iron is deposited during charge and de-plated during discharge, a redox electrode, where the ferrous and ferric ions redox reaction occurs, a separator, which prevents electrolytes from mixing and provides an ionic pathway, and electrolytes, where the energy of the IFB is stored. The capacity of an IFB battery may be driven by the amount of electrolytes stored in the external tanks as well as the amount of iron plated on the negative electrode.

The electrochemical redox reactions for an IFB battery are summarized in equations (1) and (2) wherein the forward reactions (left to right) indicate electrochemical reactions during battery charge and the reverse reactions (right to left) indicate electrochemical reaction during battery discharge.

$$Fe^{2+}+2e^- \leftrightarrow Fe^0 \text{ (Negative Electrode)} \quad (1)$$

$$2Fe^{2+} \leftrightarrow 2Fe^{3+}+2e^- \text{ (Positive Electrode)} \quad (2)$$

On the plating side of the IFB, the plating electrolyte provides a sufficient amount of $Fe^{2+}$ so that during charge, the $Fe^{2+}$ gains two electrons from the negative electrode to form $Fe^0$, which plates onto a substrate. During discharge, the plated $Fe^0$ loses two electrons, ionizing into $Fe^{2+}$ and dissolving back into the plating electrolyte. The equilibrium potential of the negative electrode reaction is −0.44V and thus, reaction (1) provides a negative terminal for the IFB system. On the redox side of the IFB, the redox electrolyte provides $Fe^{2+}$ during charge which loses an electron to the redox electrode and oxidizes to $Fe^{3+}$. During discharge, the $Fe^{3+}$ gains an electron from the redox electrode producing $Fe^{2+}$. The equilibrium potential of the positive electrode reaction is +0.77V, and thus, reaction (2) provides a positive terminal for the IFB system.

Thus, the performance of the IFB system may rely on its plating electrode performance, redox electrode performance, and ohmic resistance loss. On the positive side of the IFB, the redox reaction between $Fe^{2+}$ and $Fe^{3+}$ illustrated by reaction (2), occurs during charge and discharge. Reaction (2) is kinetically fast with minimal side reactions and may not be the limiting factor for the performance of the IFB system.

On the negative side of the IFB, the plating reaction between $Fe^{2+}$ and $Fe^0$, illustrated by reaction (1), occurs during charge and discharge. The ferrous ion, $Fe^{2+}$, gains electrons and plates as solid iron, $Fe^0$, on substrates. This plating reaction may compete with two side reactions: the reduction of hydrogen protons $H^+$ (reaction (3)), wherein two hydrogen protons each accept a single electron to form hydrogen gas, $H_2$, and the corrosion of deposited iron metal to produce ferrous ion $Fe^{2+}$ (reaction (4)), respectively:

$$H^+ + e^- \leftrightarrow \tfrac{1}{2}H_2 \quad \text{(Hydrogen proton reduction)} \quad (3)$$

$$Fe^0 + 2H^+ \leftrightarrow Fe^{2+} + H_2 \quad \text{(Iron corrosion)} \quad (4)$$

Both side reactions may reduce the overall battery efficiency, because electrons transferred to the negative electrode may be consumed by hydrogen production first rather than by iron plating. Furthermore, these side reactions may result in imbalanced positive electrolytes, which may further result in battery capacity loss over time. In addition, the generated $H_2$ may be trapped in the negative electrode which may in turn, reduce the electrochemical active area and may significantly increase electrode overpotentials.

Reaction (1) is kinetically slower than reaction (2) and may be the limiting factor for the performance of the IFB system. During charging and discharging cycles, the potential across the electrode may be low when compared to other redox battery systems. It should be noted that the plating kinetics of other battery systems may be the limiting factor for battery performance.

Turning to FIG. 2, the iron, $Fe^0$, plating kinetics of an example IFB is illustrated for various electrode materials. The iron plating kinetics are slow when initially plating iron on non-iron based substrates, such as non-Fe electrode 1 (206) and non-Fe electrode 2 (204), due to the dissimilar materials. However, once a layer of iron is plated on the substrate, the iron plating kinetics increase to several orders of magnitude faster, as shown on Fe electrode (202), since the iron is now plating onto an iron coated substrate. The performance of an IFB may mostly be limited by the kinetics of the negative plating electrode, which is a result of the plating kinetics, resistance, and mass transport losses. Therefore a range of materials can be used as negative plating electrode substrate, because as soon as iron is plated on the substrate, plating kinetics improves significantly and is no longer the rate limiting side. Thus, an electrode for use in a redox flow battery must retain or improve the plating kinetics and conductivity of currently used electrodes, such as Ti and C, in IFB systems. The disclosed coated plastic mesh electrode maintains or improves the performance, as discussed below. Coated plastic mesh is able to survive in an IFB operating condition also because the IFB electrolyte is within a pH range of 1-4, not too acidic or alkaline and electrode potential is low so that the carbon coated plastic mesh electrode does not degrade during operation.

Figure 3A:
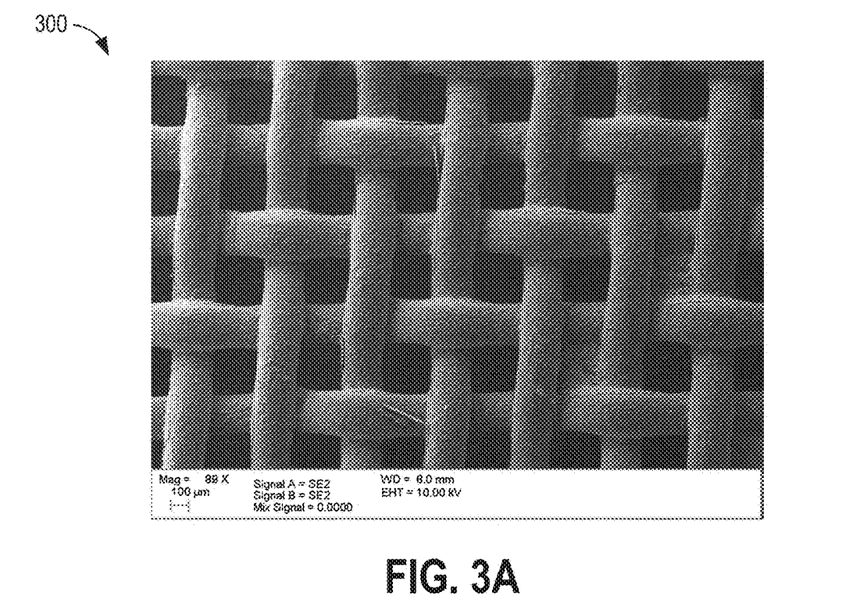
FIG. 3A shows an electron micrograph of a carbon coated plastic mesh electrode.
Figure 3B:
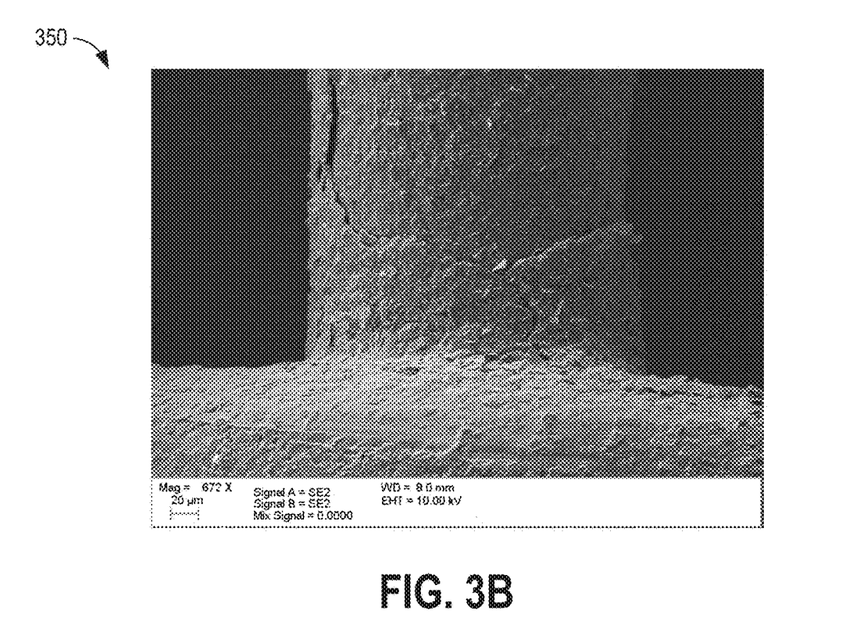
FIG. 3B shows an electron micrograph of a carbon coated plastic mesh electrode.
Figure 4:
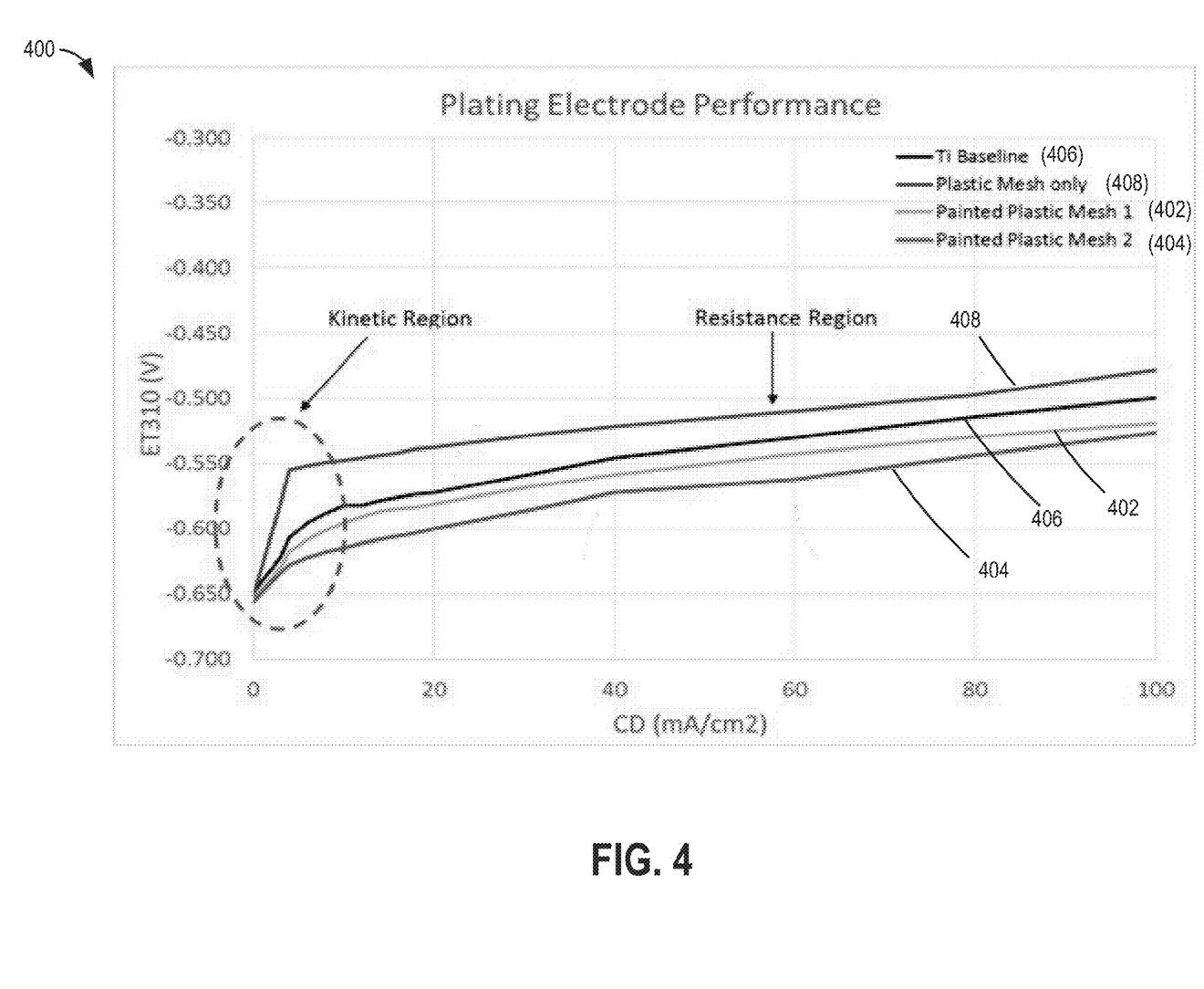
FIG. 4 shows the negative electrode performance comparison among a non-coated plastic mesh, two coated plastic meshes, and a Ti mesh as baseline.

Turning to FIGS. 3A and 3B, electron micrographs 300 and 350 of the disclosed electrode, which comprises a plastic mesh coated with a carbon material for use in redox flow batteries, are shown. Other example coating materials may be metal oxides (such as $TiO_2$) and/or hydrophilic polymers (such as sulfonated PEEK or perfluorosulfonic acid (PFSA)).

The plastic mesh may be made from a variety of plastics. In one example, the plastic mesh material may be polypropylene (PP). In another example, the plastic mesh material may be polyolefin.

The coating material may be selected from any commercially available carbon ink. For example, the carbon material may be a carbon ink selected from Electrodag, C220, C120-24, and CM112-48. FIGS. 3A and 3B show electron micrographs 300 and 350 of the carbon coated plastic mesh electrode at different magnification levels. Other example coating materials include, but are not limited to, metal oxides (such as $TiO_2$) and hydrophilic polymers (such as sulfonated PEEK or perfluorosulfonic acid (PFSA)). These coating materials may change the base plastic material from hydrophobic to hydrophilic. As such, a hydrophilic mesh may reduce the amount of hydrogen bubbles trapped in the plastic mesh.

In some embodiments, the plastic mesh may be a unipolar mesh. In other embodiments, the plastic mesh may be a bipolar mesh. In yet other embodiments, the plastic mesh may be a woven mesh. In still further embodiments, the plastic mesh may be a stretched mesh.

In some embodiments, treating the plastic mesh to improve the adhesion of the carbon material to the plastic mesh may be performed. In one example, treating the plastic mesh is done using a solvent treatment to improve adhesion of the carbon material to the plastic mesh. In another example, treating the plastic mesh is done using a plasma treatment to improve adhesion of the carbon material to the plastic mesh. In other examples, mechanical abrasion, UV radiation or electron-beam plasma may be used.

In other example embodiments, the coating material of the plastic mesh may be conductive and may comprise a material such as carbon. The carbon material may be applied to the plastic mesh to form a carbon coating. The carbon coating is conductive when used in a redox flow battery system. The carbon coating may be applied using a variety of techniques. In one example, the carbon material may be coated by air brushing. In another example, the carbon material may be coated by dip coating. In yet another example, the carbon material may be coated by roller coating.

In some examples, the coating material may further comprise a nonconductive material such as a metal oxide ($TiO_2$, etc. for example) or hydrophilic plastic coatings (SPEEK, PFSA, etc. for example). The non-conductive coating may be applied to increase hydrophilicity of the plastic mesh in some embodiments. Furthermore, an increased hydrophilicity may allow hydrogen bubbles generated by side reactions 3 and 4 not to be trapped in the plastic mesh.

The carbon coated plastic mesh electrode show a uniform coverage of the carbon coating, as illustrated in FIGS. 3A and 3B. The use of the plastic mesh reduces the amount of expensive conductive materials, such as carbon fiber or titanium, which are currently used in IFB systems while retaining the kinetics of the redox and plating reactions due to the large surface area and conductivity of the carbon coating, which allows for high storage of metal during plating. The carbon coated plastic mesh electrode may be used as the plating electrode and/or the redox electrode.

With respect to FIG. 4, this figure shows a graph 400 illustrating the negative electrode performance of plastic mesh electrodes compared with a Ti mesh baseline. A non-coated plastic mesh 408 and two types of carbon coatings applied to a plastic mesh (402, 404) are shown being compared against the Ti mesh baseline 406. The X axis of the plot (CD) represents current density and is measured in mA/cm² while the Y axis of the plot (V) represents performance of the plating electrode with respect to the overpotential achieved. The plating electrode performance is measured with reference to an Ag/AgCl reference electrode inserted into the negative flow field. The initial voltage change at low current density may indicate plating kinetics overpotential.

As shown in FIG. 4, the highest plating overpotential results from the non-coated plastic mesh only configuration. This may be due to reduced electrode surface area since the non-coated plastic mesh is non-conductive.

Two plastic meshes (1 and 2 (indicated as 402 and 404 in FIG. 4)) which are coated with carbon ink in one embodiment, show similar or even less overpotential relative to the Ti mesh baseline 406. This may suggest that a similar or more conductive surface area may be available on those coated plastic meshes relative to the surface area of the Ti baseline. At a higher current density region, performance loss may be driven by ohmic resistance loss, which may be a combined result of mesh resistance and electrolyte resistance within the mesh. The ohmic resistance may therefore be a combined result of electrolyte conductivity, mesh open area, mesh thickness and mesh electrical resistance.

Figure 5:
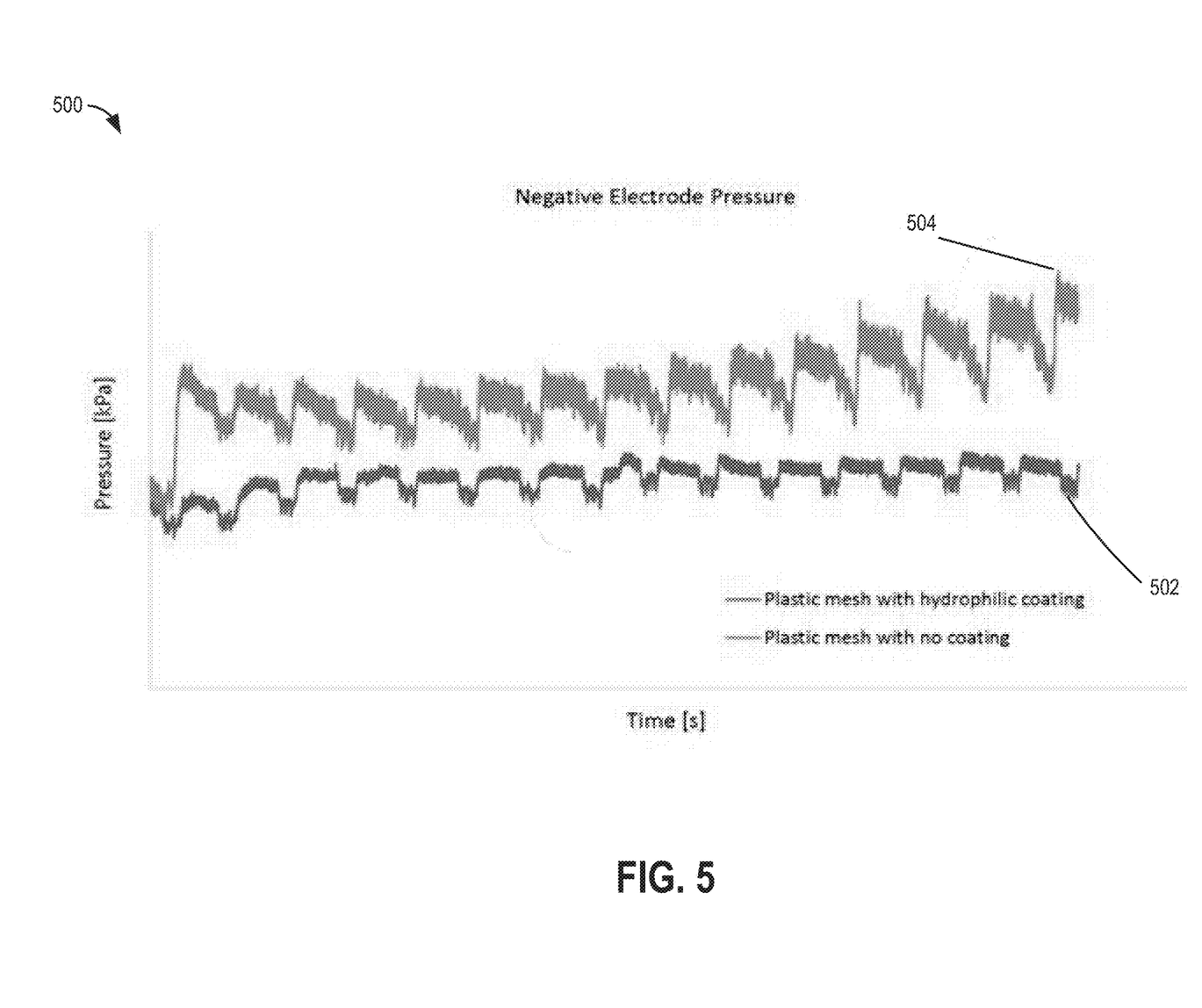
FIG. 5 shows the negative electrode pressure between a hydrophobic non-coated mesh and the same mesh with a hydrophilic coating.

Turning now to FIG. 5, in graph 500, the pressures within the negative electrode compartment while operating with a non-coated hydrophobic plastic mesh and a coated, conductive, and hydrophilic plastic mesh are compared. Pressure transducers were installed on the IFB battery in one example to characterize IFB negative and positive electrolyte pressures during cycle operation. During the initial charge, negative pressure may increase as shown due to hydrogen generation. Under the same operation conditions, this pressure increase 504 was significantly higher with a non-coated hydrophobic plastic mesh than the same mesh with a hydrophilic coating 502, as shown in FIG. 5. In addition, from cycle to cycle, the internal pressure of the non-coated plastic mesh built up, suggesting that hydrogen bubbles may not have been effectively purged out from cycle to cycle. When this mesh was coated with a hydrophilic carbon coating however, the mesh contact angle with DI water was reduced from >90° to less than 45°. The same battery was therefore, able to operate at a much lower and more repeatable pressure range which may indicate that hydrogen being generated was effectively purged out of the battery during cycle performance. This purging of hydrogen gas may be critical in the operation of the battery because when hydrogen gas is not purged out of the battery effectively, the battery active area may be reduced. Therefore, the battery performance may be reduced while exhibiting an effectively higher operating current density. Furthermore the battery plating volume may also be reduced, which may be further illustrated by the picture provided in FIG. 6.

Figure 6:
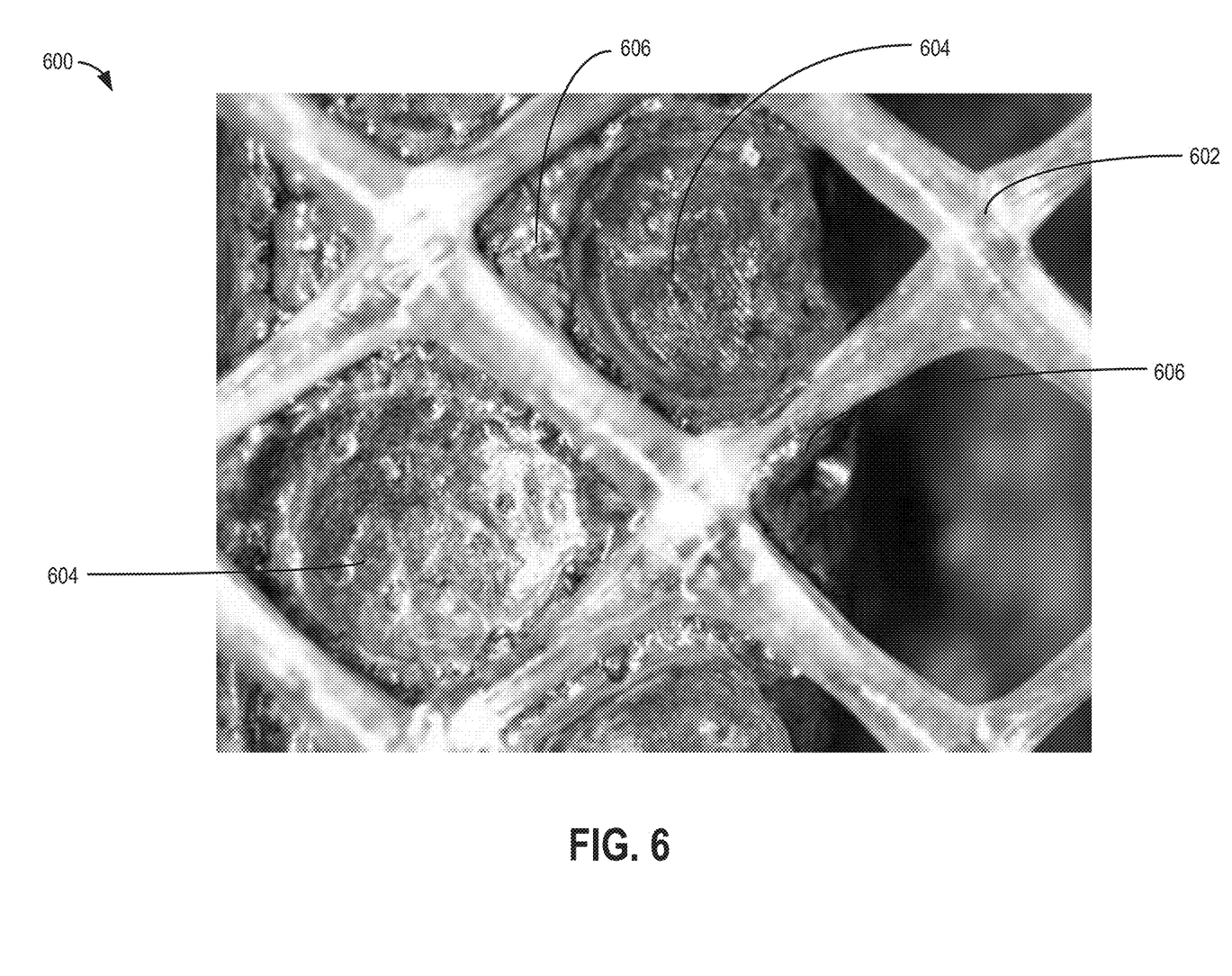
FIG. 6 shows an example of a trapped hydrogen bubble in a non-coated mesh and how it affects the location and morphology of the coated Fe.
Figure 7:
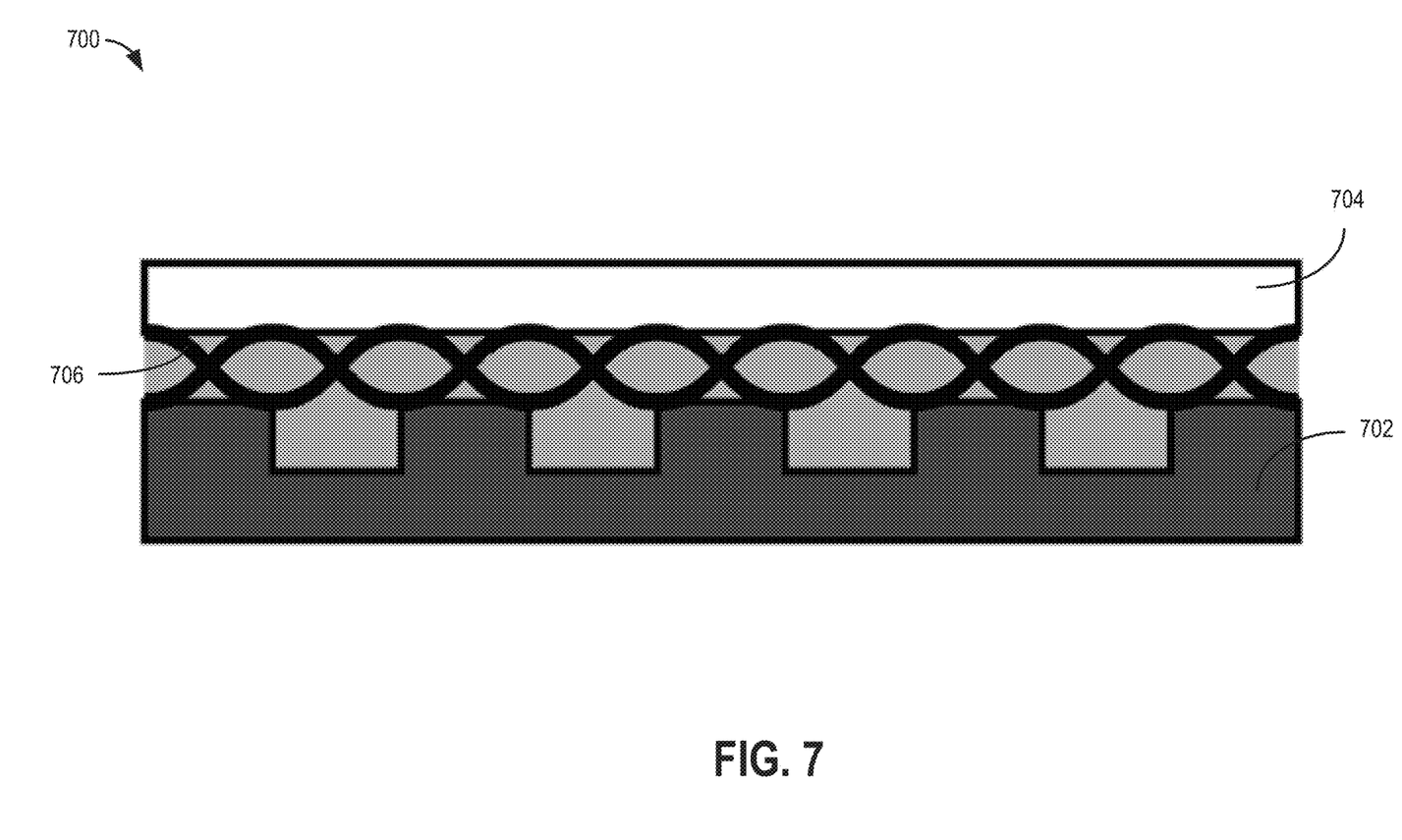
FIG. 7 shows a schematic of a coating on a plastic mesh.

FIG. 6 shows an image 600 of the above non-coated plating electrode when the battery may be fully charged. The transparent mesh structure 602 of the figure illustrates the non-coated plastic mesh of one embodiment. The dark surface underneath the mesh is the plated iron 606 plated onto the plastic mesh. The uneven bubble-like structures 604 marked in the Figure shows a deformation in the plating iron 606 left behind by trapped hydrogen bubbles during charge of the battery. Furthermore, the picture not only shows that hydrogen bubbles were trapped within the mesh, it also indicates that iron plating 606 occurred around the hydrogen bubbles 604. This inconsistent plating may present an issue for the negative electrode because first of all, the trapped hydrogen bubbles may reduce the overall volume available for plating and the bubbles may effectively reduce the active area on the plating electrode, which may lead to uneven plating and even local shorting due to overplating locally.

Turning to FIG. 7, a schematic 700 of applying a coated plastic mesh as the redox or the plating electrode in an IFB is illustrated. 702 refers to the flow plate channels where electrolytes are directed in and out of the IFB battery. 706 refers to the redox or plating electrode, which could be a carbon paper or Ti mesh or coated plastic mesh materials. 704 refers to the membrane separator that separates the positive and negative electrode compartments. The ohmic resistance of the electrode is the combined ionic resistance and electrical resistance of 706, where ionic resistance is determined by electrolyte resistivity, mesh open area and mesh thickness while the electrical resistance is determined by coating type, thickness and mesh wire size. When a non-conductive coating is used, the ohmic resistance of 706 is only the ionic resistance through the electrolyte. The coated plastic mesh electrode dimensions may be optimized for performance within a redox flow battery. For example, Table 1 below provides a list of surface area (mm²), open area, open volume and mesh thickness (mm) of carbon coated plastic mesh electrodes tested in an IFB system as compared to metal Ti mesh electrodes. Table 1:

TABLE 1

| Mesh Type | Mesh ID | Additional Surface Area [mm²/cm²] | Open Area % | Open Volume % | Mesh Thickness [mm] |
|---|---|---|---|---|---|
| Metal | Ti | 124.55 | 64% | 84% | 0.56 |
| Plastic | 51PP Mesh | 264.80 | 34% | 67% | 0.43 |
|  | 121PP Mesh | 385.74 | 15% | 52% | 0.33 |
|  | 125PP Mesh | 314.38 | 25% | 61% | 0.20 |
|  | WP0200 | 293.58 | 28% | 63% | 0.36 |
|  | WP0300 | 221.02 | 42% | 72% | 0.33 |
|  | WP0350 | 254.43 | 35% | 68% | 0.48 |
|  | XN4800 | 125.89 | 64% | 84% | 0.50 |

The carbon coated plastic mesh electrodes may be fabricated to provide dimensions similar to the current metal electrodes. The carbon coated plastic mesh electrode allows for further refinements to the dimensions illustrated in Table 1 to optimize performance. For example, the carbon coated plastic mesh electrode for use as an electrode may have an open volume of 10% to 70%, a thickness of between about 0.20 mm to about 0.50 mm, and an open area of 15% to 65%. As used in the current disclosure, the term about includes additional ranges slightly above or below a value without changing the physical characteristics or resultant properties of the material. The carbon coated plastic mesh electrode may be optimized for conductivity, plating area, etc.

Figure 8:
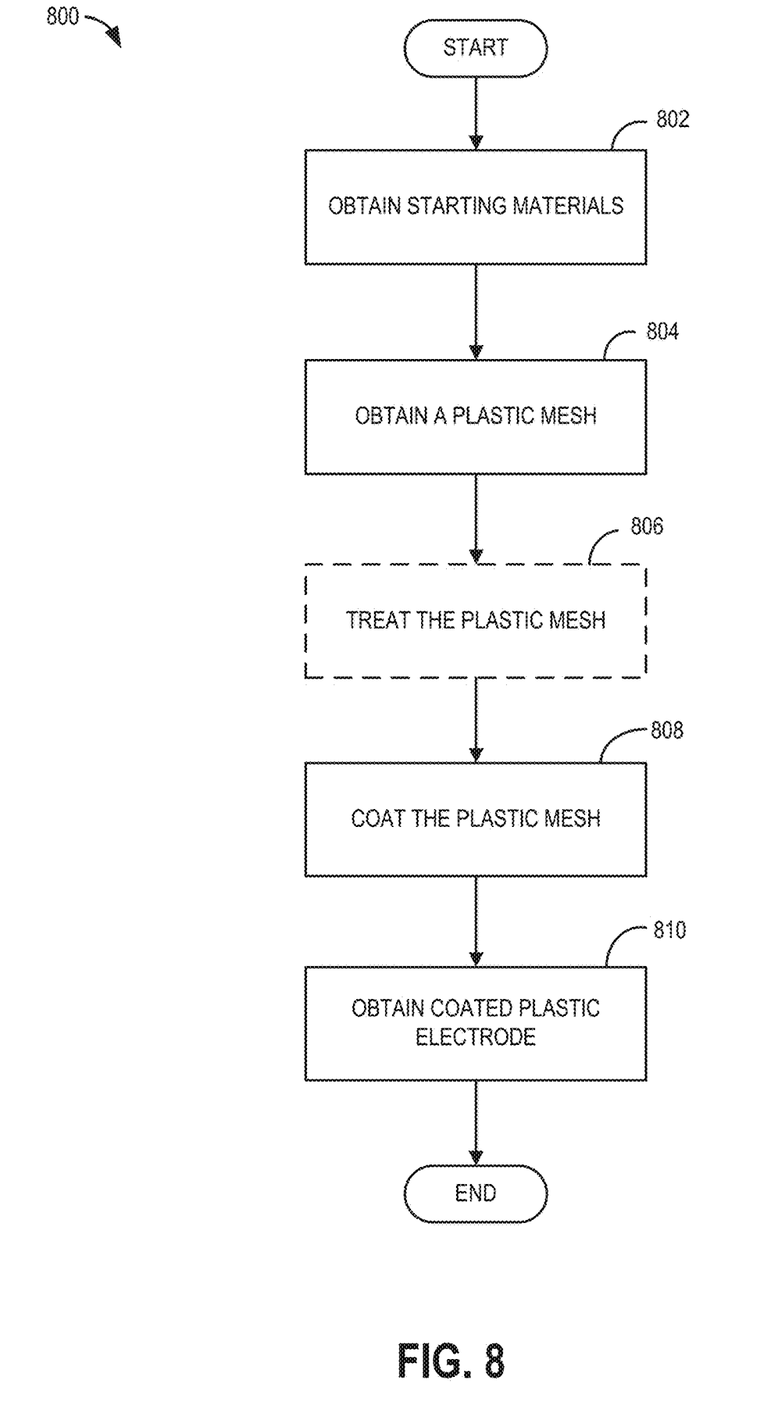
FIG. 8 shows an example method for fabricating a coated plastic mesh electrode.

Turning to FIG. 8, an example method 800 for fabricating a coated plastic mesh electrode is provided. The method 800 may provide an electrode for use in an IFB redox flow battery comprising fabricating a plastic mesh, treating the plastic mesh, and coating the plastic mesh. The fabricated electrode may be used as a positive electrode or negative electrode within the IFB redox flow battery.

At 802, the method 800 may include obtaining starting materials. For example, the plastic mesh and carbon material may be obtained. In one example, the plastic mesh may be fabricated from polypropylene. In another example, the plastic mesh may be fabricated from polyolefin. The coating material may be conductive, such as a carbon ink. For example, the carbon ink may be one or more of Electrodag, C220, CM120-24, and CM112-48. The coating material may further comprise a non-conductive material, such as a metal oxide or a hydrophilic polymer. For example, a metal oxide may be $TiO_2$, and a hydrophilic polymer may be SPEEK or PFSA.

At 804, the method 800 may include obtaining a plastic mesh. The plastic mesh may include a surface area, an open area, an open volume, and a thickness which is optimized for electrode performance. For example, the plastic mesh may be selected to include the dimensions listed in Table 1 above. The obtained plastic mesh may be made from polypropylene, polyolefin, etc. and be unipolar, bipolar, or woven.

At 806, the method 800 may include treating the plastic mesh fabricated at 804. Treating the plastic mesh may be done to improve the adhesion of the subsequent coating step 808. In some embodiments, the method 800 includes treating the fabricated plastic mesh to improve adhesion of the carbon coating. In other embodiments, the method 800 may not include treating the fabricated plastic mesh to improve adhesion. In one example, treating the plastic mesh may be done using a solvent treatment. In another example, treating the plastic mesh may be done using a plasma treatment.

Various surface treatments may be used to improve the adhesion of coatings to plastics, including flame and corona, mechanical abrasion, solvent cleaning or swelling followed by wet chemical etching, or the application of specialized coatings in the form of chemical primers or any combination thereof. Additional treatments, such as high energy density treatments such as ultraviolet (UV) radiation, electron-beam and cold-gas-plasma methods and combinations thereof may also be used. The methods described above have gained greater acceptance on a larger scale for substrate surface modification. These methods may provide a medium rich in reactive species, such as energetic photons, electrons, free radicals, and ions, which, in turn, may interact with the polymer surface, changing its chemistry and/or morphology. These processes may be readily adopted to modify surface properties of plastic meshes.

At 808, the method 800 includes coating the plastic mesh with a selected material. In one example, coating the plastic mesh with the carbon material may be done by air brushing. In another example, coating the plastic mesh with the carbon material may be done by dip coating. In yet another example, coating the plastic mesh with the carbon material may be done by roller coating. The coating thickness may be optimized for conductivity and/or plating. The coating may require a heat treatment for curing and eliminating any solvents.

At 810, the method 800 may obtain the coated plastic electrode. The coated plastic electrode may be used as the plating electrode and/or the redox electrode in redox flow battery systems. The method 800 may then end.

Thus, an electrode may be fabricated for use in a redox flow battery system. The example method above may be used to fabricate the electrode, wherein the electrode is a novel carbon coated plastic mesh electrode which improves battery performance and reduces cost. The use of low cost plastic materials, which is contrary to the current way of thinking due to plastics not being stable in current electrolyte systems employed, leads to the novel carbon coated plastic mesh based electrode for use in IFB systems. The carbon coated plastic mesh electrode may be used at the negative electrode position and/or the positive electrode position of a redox flow battery system.

Figure 9:
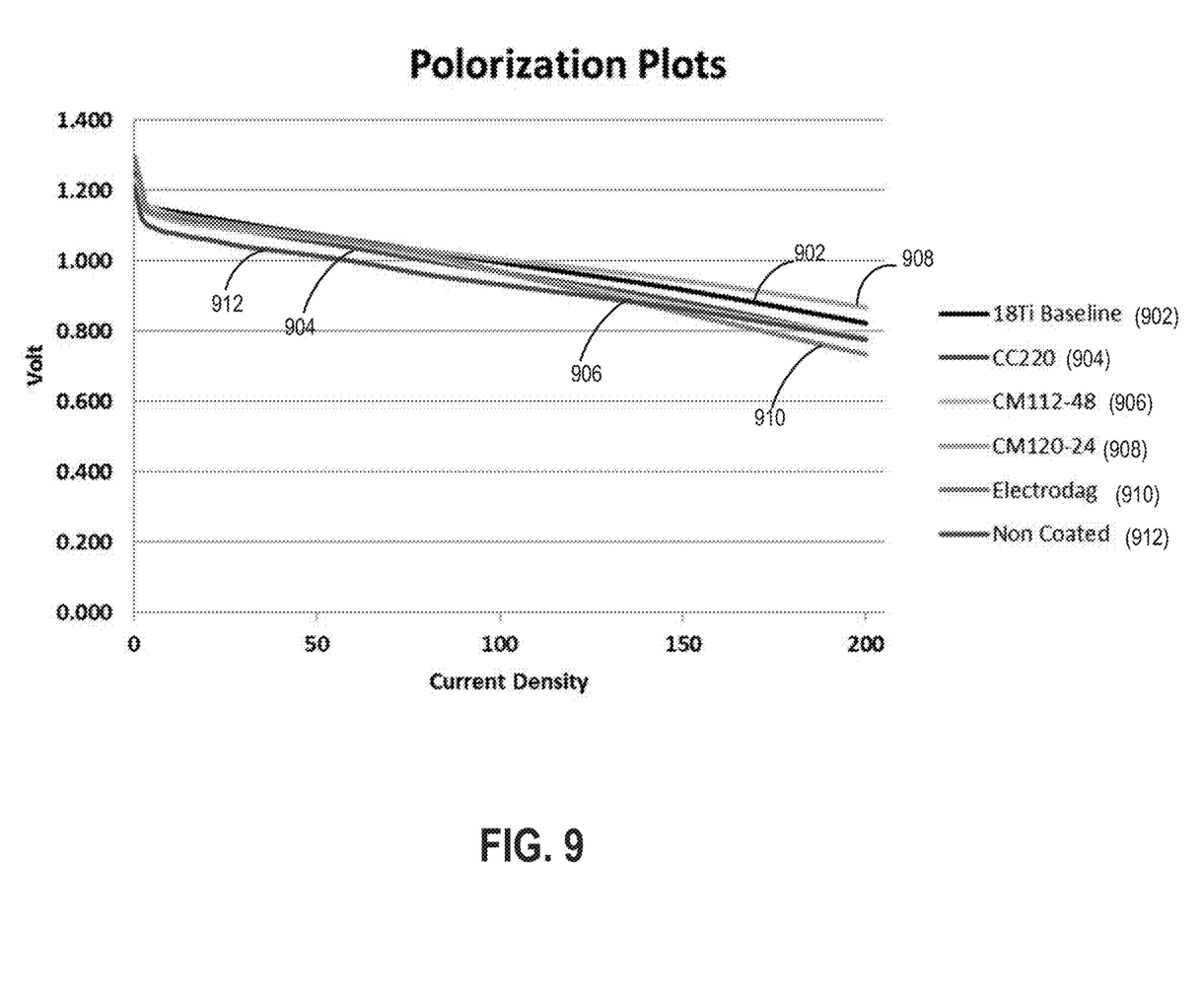
FIG. 9 illustrates carbon coated plastic mesh electrode performance.

Turning to FIG. 9, the performance of several carbon coated plastic mesh electrodes are illustrated versus a Ti mesh control electrode. In FIG. 9, the polarization plots of the carbon coated plastic mesh electrodes 904, 906, and 908 provide an improved or similar current density vs. voltage response in comparison to the Ti mesh control electrode 902. The uncoated plastic mesh electrode 912 shows a lower voltage response in comparison to the Ti mesh control electrode 902 and the carbon coated plastic mesh electrodes 904, 906, and 908. The Electrodag electrode 910 shows good voltage at low current densities and lower voltage at higher current densities as compared to the other carbon coated mesh electrodes. The results illustrate that the carbon coating enhances the conductivity of the carbon coated plastic mesh electrode in comparison to an uncoated plastic mesh electrode 912. Thus, the carbon coated plastic mesh electrode provides a low cost alternative for use in redox flow batteries which improves or maintains the current density in comparison to currently used electrode materials.

Figure 10:
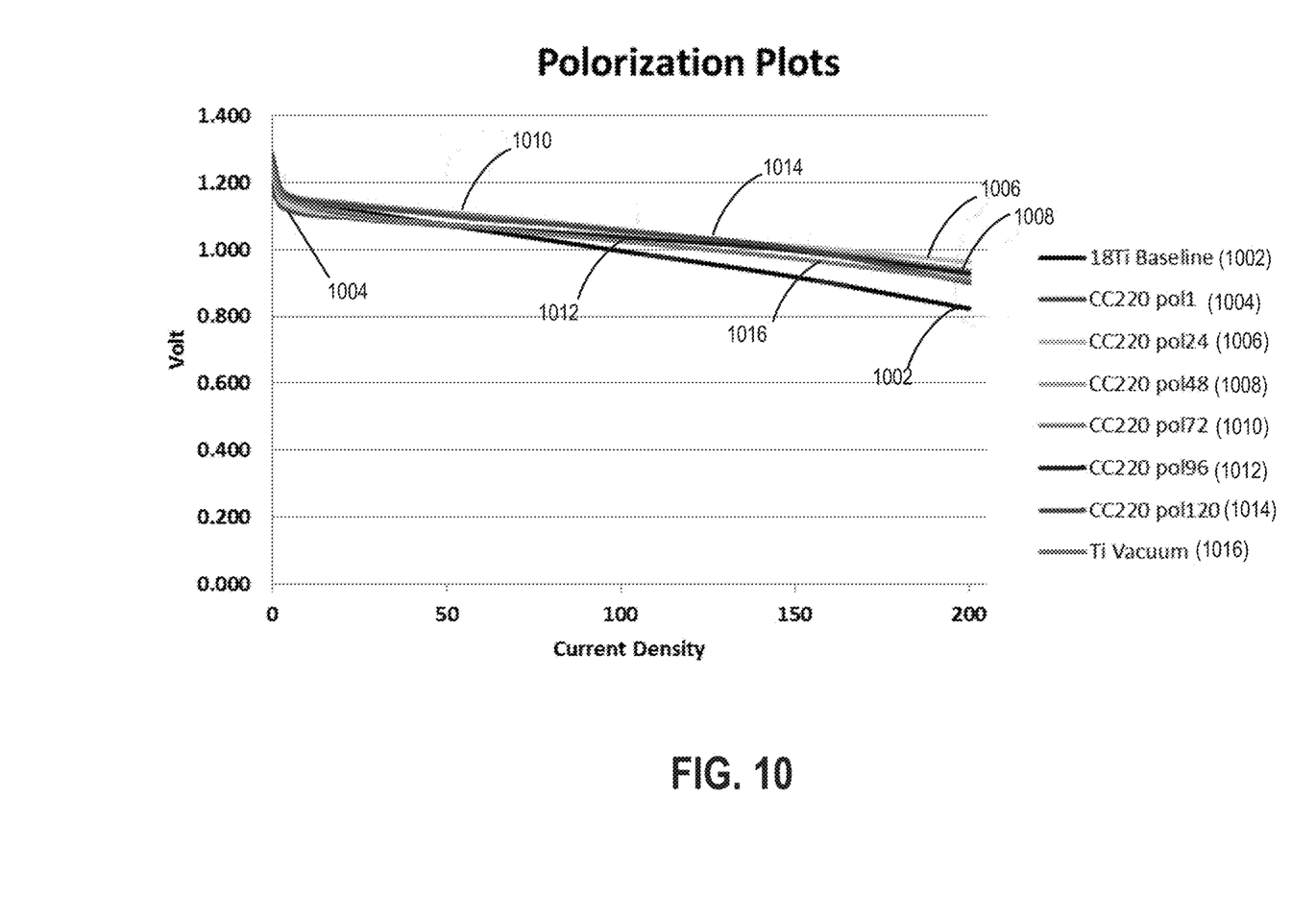
FIG. 10 illustrates a carbon-coated plastic mesh electrode performance throughout cycling.

Turning to FIG. 10, the cycle performance of one a carbon coated plastic mesh electrode is illustrated. The Ti mesh control electrode 1002 and Ti vacuum electrode 1016 are included as baselines. The carbon coated plastic mesh electrode was cycled for over 100 cycles and the performance monitored. The carbon coated plastic mesh electrodes polarizations were plotted at 1 cycle, 24 cycles, 48 cycles, 72 cycles, 96 cycles, and 120 cycles at 1004, 1006, 1008, 1010, 1012, and 1014 respectively. From FIG. 10, the carbon coated plastic mesh electrode is seen to retain the current density versus voltage response in comparison to the Ti vacuum electrode 1016 as well as show an improved response in comparison to the Ti mesh control electrode 1002.

In an exemplary embodiment of an electrode for use in an all-iron redox flow battery, a potential of the electrode does not decrease by more than 0.1 volts at a current density less than 20 $mA/cm^2$.

It will also be appreciated that the configurations and routines disclosed herein are exemplary in nature, and that these specific embodiments are not to be considered in a limiting sense, because numerous variations are possible. For example, the above technology may be applied to other flow battery types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

This concludes the description. The reading of it by those skilled in the art would bring to mind many alterations and modifications without departing from the spirit and the scope of the description. For example, hybrid redox flow battery systems, all-iron hybrid redox flow battery systems, and other redox flow battery systems may all take advantage of the present description.

The invention claimed is:

1. An electrode for use in an all-iron redox flow battery, comprising: a plastic mesh positioned adjacent to flow plate channels, the flow plate channels and the plastic mesh configured for receiving and directing an iron salt electrolyte pumped from an electrolyte source of the all-iron redox flow battery; and a coating on the plastic mesh to form a coated plastic mesh for plating iron metal from the iron salt electrolyte, wherein the coating is a hydrophilic coating or a conductive coating, and the coating is selected for interfacing with the iron salt electrolyte as used in the all-iron redox flow battery; wherein an electrode reaction potential is less than 0.8 V; and wherein the coated plastic mesh has an open area of 15% to 65% and an open volume of 10% to 70%.

2. The electrode of claim 1, wherein the hydrophilic coating is selected from: hydrophilic polymers.

3. The electrode of claim 2, wherein the hydrophilic coating is a hydrophilic perfluorosulfonic acid polymer.

4. The electrode of claim 1, wherein the conductive coating is a conductive carbon based material.

5. The electrode of claim 4, wherein the conductive coating is a carbon ink.

6. The electrode of claim 1, wherein the coated plastic mesh is treated with a solvent treatment technique or a plasma treatment technique or a mechanical abrasion technique.

7. The electrode of claim 1, wherein the coated plastic mesh has a thickness of between about 0.20 mm to about 0.50 mm.

8. The electrode of claim 1, wherein the coated plastic mesh has a water contact angle of less than 45°.

9. The electrode of claim 1, wherein a non-conductive coating is used for a plating electrode.

10. The electrode of claim 1, wherein the plastic mesh is one of polypropylene or polyolefin.

11. The electrode of claim 1, wherein the plastic mesh is coated with the coating by using a technique selected from: air brushing, dip coating, or roller coating.

12. The electrode of claim 1, wherein a potential of the electrode does not decrease by more than 0.1 volts at a current density less than 20 mA/cm$^2$.

13. The electrode of claim 6, wherein the coated plastic mesh is treated with the plasma treatment technique, where the plasma treatment technique is an electron-beam plasma treatment technique or a cold-gas plasma treatment technique.

14. The electrode of claim 1, wherein the coated plastic mesh is treated with a UV radiation treatment technique.

15. An electrode for use in an all-iron redox flow battery, comprising: a plastic mesh positioned adjacent to flow plate channels, the flow plate channels and the plastic mesh configured for receiving and directing an electrolyte pumped from one of a plurality of tanks of the ail-iron redox flow battery; and a coating on the plastic mesh to form a coated plastic mesh for plating an iron electro-active material on the electrode from the electrolyte, wherein the coating is a hydrophilic coating or a conductive coating, and the coating is selected for interfacing with the electrolyte as used in the all-iron redox flow battery; wherein the coated plastic mesh has an open area of 15% to 65% and an open volume of 10% to 70%, and a thickness of between about 0.20 mm to about 0.50 mm; and wherein the coated plastic mesh has a greater conductive surface area than a titanium mesh electrode.

16. The electrode of claim 15, wherein the flowing electrolyte has a pH of between 1 to 4.

17. The electrode of claim 15, wherein
the conductive coating is a conductive carbon based material; and
the coating uniformly covers the plastic mesh.

\* \* \* \* \*